United States Patent [19]
Biondetti

[11] 3,932,921

[45] Jan. 20, 1976

[54] CONTROLLED DEFLECTION ROLL

[75] Inventor: Mario Biondetti, Schio, Italy

[73] Assignee: Escher-Wyss Limited, Zurich, Switzerland

[22] Filed: Feb. 10, 1975

[21] Appl. No.: 548,419

[30] Foreign Application Priority Data

Feb. 12, 1974 Switzerland.......................... 1921/74

[52] U.S. Cl............................................ 29/116 AD
[51] Int. Cl.²........................................ B21B 13/02
[58] Field of Search ..... 29/116 AD, 113 AD, 116 R

[56] References Cited
UNITED STATES PATENTS

| | | | |
|---|---|---|---|
| 3,119,324 | 1/1964 | Justus.......................... | 29/116 AD X |
| 3,131,625 | 5/1964 | Kusters et al. ............. | 29/116 AD X |
| 3,430,319 | 4/1969 | Staugen.......................... | 29/116 AD |
| 3,587,152 | 6/1971 | Hold .............................. | 29/116 AD |
| 3,747,181 | 7/1973 | Nykopp et al. ................ | 29/113 AD |
| 3,802,044 | 4/1974 | Spillmann et al. ............. | 29/113 AD |
| 3,846,883 | 11/1974 | Biondetti........................ | 29/116 AD |
| 3,879,827 | 4/1975 | Lehmann ........................ | 29/116 AD |
| 3,885,283 | 5/1975 | Biondetti........................ | 29/116 AD |

*Primary Examiner*—Alfred R. Guest
*Attorney, Agent, or Firm*—Pennie & Edmonds

[57] ABSTRACT

A controlled deflection roll with a fixed beam and surrounding roll shell with pistons guided in radial bores of the beam and bearing against the inner surface of the shell for support thereof is provided, in the branch ducts delivering hydraulic fluid under pressure from a common manifold to the individual pistons, with adjustable valves controlled remotely by means of hydraulic or electrical signals to permit individual control of the shell-supporting pistons.

7 Claims, 3 Drawing Figures

CONTROLLED DEFLECTION ROLL

The present invention pertains to flexure-compensated or, as they are sometimes called, crown control or controlled deflection rolls. Such rolls are useful for example in the paper industry where a wide web is passed between two mating rolls and where it is desirable to control closely the separation of the rolls across the entire width of the web, notwithstanding flexure of the rolls.

Controlled deflection rolls have been heretofore proposed, for example in U.S. Pat. No. 3,802,044. In the controlled deflection roll of that patent a cylindrical tube or shell is rotatably mounted about a stationary shaft or beam. In one controlled deflection roll described in that patent, a number of cylindrical bores are formed in the beam, extending radially thereof, with the axes of the bores in a common plane. These bores accommodate pistons which function as hydrostatically lubricated support members for the roll shell, a hydraulic or other fluid medium being supplied under pressure to the underside of these pistons from an axial duct or manifold in the beam. The pistons are thereby stressed radially outward against the roll shell, and stress it in turn against a mating roll along a "nip" or line of contact, at which sheet material passing between the controlled deflection roll and the mating roll is squeezed, for example to control or alter the thickness of the sheet material. The position of the piston and cylinder may be interchanged, the "piston" being fixed on the beam but having a connection from its radially outer face to the conduit for hydraulic fluid under pressure, and the "cylinder," closed at its outer end except for capillaries for feed of the hydrostatic bearing pads, fitting movably over the "piston." Such a construction is shown in FIG. 4 of the cited patent. The member radially movable with respect to the beam, whether a piston or a cylinder, will hereinafter sometimes be referred to as a roll shell support member. The radially movable member and the associated guide surface on the beam, e.g. cylindrical, will hereinafter sometimes be referred to as a shell supporting element. Other controlled deflection rolls are described in U.S. Pat. No. 3,846,883 and in the copending applications Ser. No. 409,644, filed Oct. 25, 1973, now U.S. Pat. No. 3,885,283, issued May 27, 1975; No. 478,033, filed June 10, 1974, now U.S. Pat. No. 3,879,827, issued Apr. 29, 1975; and No. 520,979, filed Nov. 5, 1974; all of which like U.S. Pat. No. 3,802,044 are assigned to the assignee hereof.

The rolls of U.S. Pat. No. 3,802,044 permit the treatment under pressure of materials in web form such as paper with a high degree of uniformity. In particular, the roll of that patent makes it possible to maintain a uniform pressure between the roll shell and a mating roll across the entire width of the web, i.e. over the entire length of the roll shell and its mating roll, notwithstanding flexure of the beam.

In many cases, however, it is desirable to be able to control individually the force exerted on the inside face of the roll shell by the separate roll shell support elements. By individually adjusting these forces it is possible to compensate for variations in the roll shell profile which might otherwise occur, due to such factors as variations in the stiffness of the roll shell along its length — factors which if not compensated would result in non-uniform pressure or separation between the controlled deflection and mating rolls lengthwise of the nip. With previously known rolls such as that of U.S. Pat. No. 3,802,044 it was necessary, in order to provide such individual control, to provide a separate source of hydraulic pressure and a separate duct leading therefrom to the individual shell supporting elements. Such separate ducts lengthwise of the beam are expensive to provide and have the further disadvantage that they tend to weaken the beam, which is desired to be as stiff as possible.

The invention provides a controlled deflection roll which surmounts this shortcoming and in which plural shell supporting elements may be large in number and which may be disposed in one or more rows lengthwise of the beam, are fed from a single high pressure duct extending axially of the beam, the stress exerted by the individual roll shell support members being nevertheless individually and continuously adjustable during operation of the roll.

In accordance with the invention, one duct extending axially of the beam and leading to an exterior source of fluid under pressure connects to branch ducts, one for each shell supporting element. At the junction between the axial duct and the branch duct for at least one of these elements there is provided a control means, for example an adjustable valve, which can be remotely controlled. The invention thus makes possible individually controlled supply of hydraulic fluid under pressure to the separate roll shell supporting elements. For operation of the control devices which are individual to these elements, it is then necessary only to provide a signal line to each. These signal lines may for example take the form of small diameter hydraulic or pneumatic tubes, or of electrical conductors, which can be disposed outside the beam. A single duct suffices for delivery of the hydraulic medium under pressure to all of the roll shell supporting elements.

BRIEF DESCRIPTION OF THE DRAWINGS

The invention will now be further described in terms of a number of presently preferred embodiments and with reference to the accompanying drawings in which.

DESCRIPTION OF PREFERRED EMBODIMENTS

Figure 1:
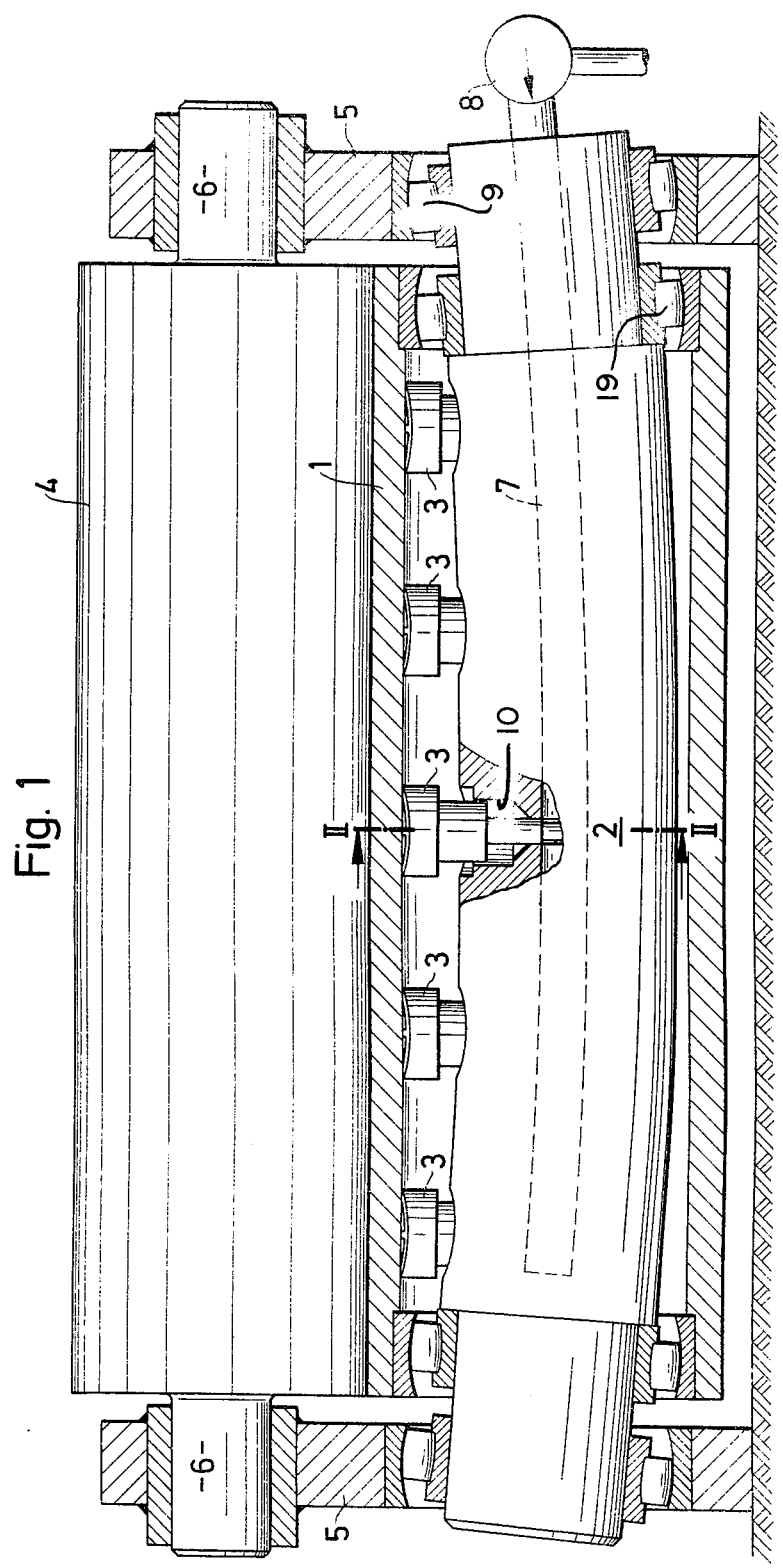
FIG. 1 is a schematic diagram of a controlled deflection roll in accordance with the invention, shown in cooperative relation with a mating roll.

Referring to FIG. 1, reference character 1 identifies the roll shell of the controlled deflection roll which is the lower of the two rolls shown. The mating roll is indicated at 4. The mating roll is rotatably mounted in a frame 5 and may be rotated by a suitable motor coupled to it, for example at one of its end shafts 6.

In addition to its roll shell 1, the controlled deflection roll includes a beam or core 2 which may be cylindrical in shape. The beam is supported in the frame 5 by bearings diagrammatically indicated at 9 so as to permit transverse flexure of the beam (shown exaggeratedly in the drawing), but the beam is prevented by suitable means not shown from rotating about its longitudinal axis.

The beam has formed therein a number of radially extending cylindrical cavities or bores of which one is generally indicated at 10. Each of these constitutes a guide surface which guides a roll shell supporting member 3, which takes the form of a piston in the embodiment illustrated. The bores 10 have their axes in a common meridian plane of the beam, which is the plane containing the axes of the beam and of the mating roll 4. The roll shell is additionally supported or guided from the beam by bearing means diagrammatically indicated at 19. These may, without limitation, be of the type described in my copending application Ser. No. 409,644, filed Oct. 25, 1973.

The beam includes an axial duct 7 for the supply of hydraulic fluid under pressure from a supply pump 8 to the roll shell supporting elements, each of which comprises one of the roll shell support members 3 and its associated guide surface 10.

Figure 2:
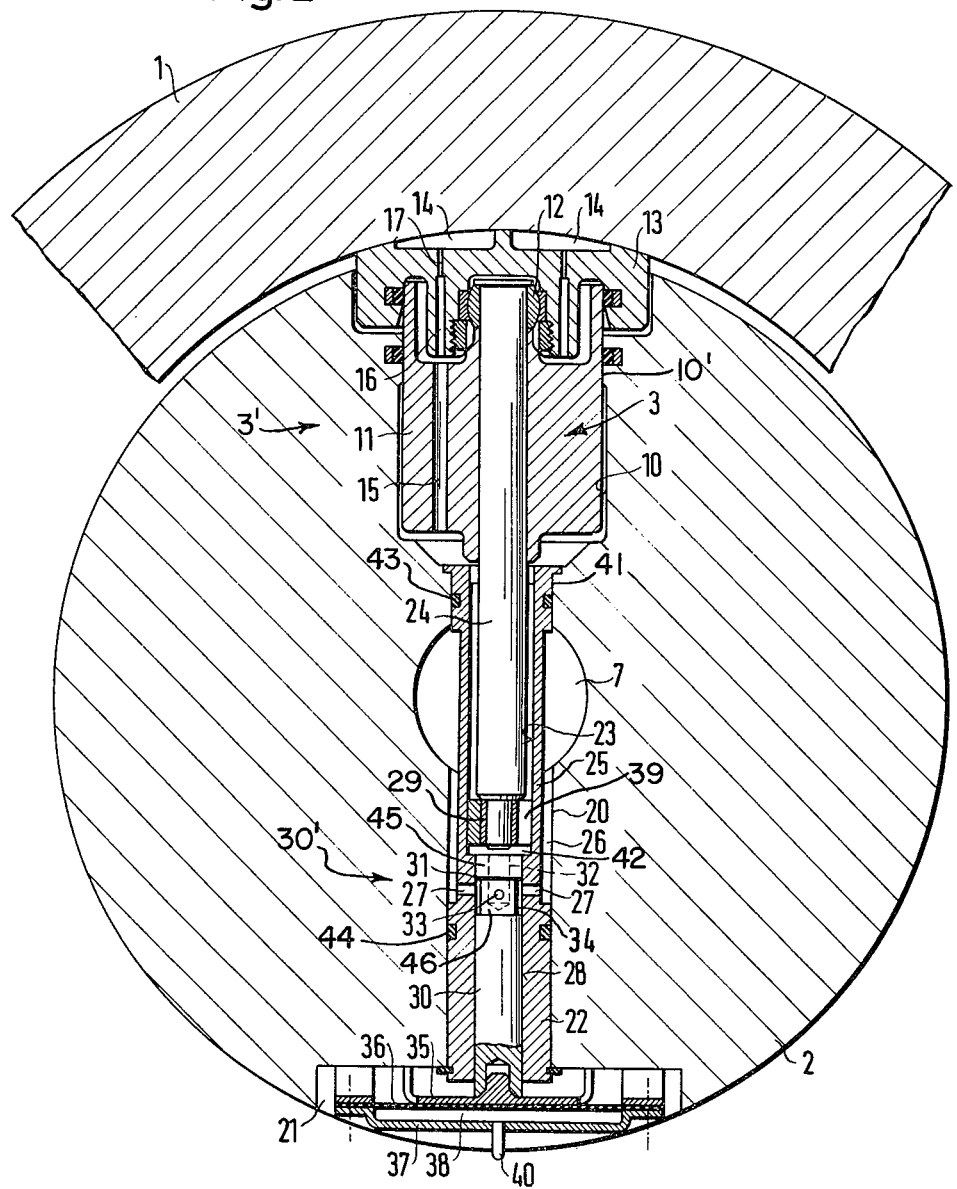
FIG. 2 is a fragmentary section taken on the line II—II of FIG. 1.

Referring now to FIG. 2, the beam 2 with its conduit 7 and the shell 1 are seen in cross-section, the latter fragmentarily. A roll shell supporting element, generally identified at 3', includes a roll shell support member, generally indicated at 3, and the cylindrical cavity 10 shown. The support member 3 in turn comprises a piston 11 and a shoe 13 which is coupled to the piston at a spherical bearing 12. The shoe 13 is provided with hydrostatic bearing pockets 14. These pockets connect via capillary constrictions 17 and bores 16 through the shoe and via a passage 15 through the piston 11 to the high pressure side of the latter, i.e. to the cylindrical cavity 10. In the particular embodiment shown the piston is guided in its motion with respect to the beam at a cylindrical surface 10' and also at a stationary sleeve 29 which receives the reduced end of a pin 24 which is coaxial with and fixed to the piston 11.

The cylindrical cavity 10 communicates with the axial duct 7 at a cylindrical opening 41, which is however closed by a bushing 22 as will be described presently. The cavity 10 is continued on the opposite side of the duct 7 in a cylindrical opening 20, which like the opening 41 is coaxial with the cavity 10 and terminates in an enlargement 21.

Into the openings 41 and 20 is fitted a sleeve-shaped bushing or closure member 22, sealed to the openings 41 and 20 at packings 43 and 44 respectively. The member 22 accommodates the pin 24 with clearance, as indicated at 23. An inner bushing or sleeve 29, which like the sleeve 22 is stationary, provides a bearing for the lower, reduced diameter end of pin 24. The piston 11 is thus guided in its motion radially of the beam at 10' and at 29. The inner bushing 29 is apertured to provide a passage 39 between the annular clearance 23 and a space 42 below the inner bushing 29. Clearance 23 and space 42 are both inside of bushing 22.

The bushing 22 movably accommodates a piston-shaped slide valve member generally indicated at 30. Valve member 30 has (in FIG. 2) an uppermost portion 45 and below that portion a portion 46 of reduced diameter bounded at its upper end by a throttling edge 31. An annular space 34 is thus provided between the portion 46 of reduced diameter and the inside cylindrical wall 28 of the bushing 22 at which the slide valve member 30 is supported. Radial ports 27 give access between the annular space 34 and an annular space 26 which is defined between the walls of the opening 20 and the exterior surface of the bushing 22, which is of reduced diameter between the ports 27 and duct 7. The slide valve member 30 additionally includes at its upper end an axial bore 32 which communicates with a radial port 33 in member 30. Accordingly, unless the ports 27 are closed by portion 45 of slide valve member 30, communication exists from the duct 7, annular space 26, ports 27, annular space 34, radial port 33, axial bore 32, space 42, passage 39 and clearance 23 to the cylindrical cavity 10. The degree of opening of the ports 27 is governed by the vertical position of the slide valve member 30.

At the lower end of the slide valve member 30 there is provided a flexible spider 35 over which is stretched an elastic membrane 36, advantageously made of oil-resistant rubber. The membrane 36 is supported on a housing 37 which in turn is received in the enlargement 21 of the radial bore 20. A closed chamber 38 is defined between the housing 37 and the membrane. The space 38 in the housing 37 is connected through a hydraulic or pneumatic signal line 40 to a source of signals not shown, advantageously disposed outside the complete roll set shown in FIG. 1. The signal line 40 may take the form of a copper or rubber tube. Control signals in the form of variations in fluid pressure are delivered to line 40, in order to adjust the setting of the control valve for the shell supporting element 3'. This control valve comprises valve member 30 and bushing 22 with its ports 27, and is generally indicated in FIG. 2 at the reference character 30'.

When plural shell supporting elements are provided as indicated in FIG. 1, each one may be provided with a separate control valve 30' as just described. The signal lines 40 to the individual shell supporting elements may be disposed outside the beam.

In operation, the hydraulic pressure existing in the cylindrical cavity 10 of each shell supporting element 3' exerts a downward force on the upper face of the slide valve member 30 in the associated valve 30'. This force is balanced against the upward force exerted on that member 30 by the membrane 36, which upward force in turn is controlled by the pressure in line 40. The control valve 30' thus controls, at the edge 31 of the valve member 30, the supply of hydraulic fluid into the cylinder 10 in such fashion that equilibrium is established between the upward and downward forces acting on the member 30. This makes it possible to control individually, for each shell supporting element 3' through its associated signal line 40, the supporting force exerted on the roll shell by the roll shell support member of that element.

Figure 3:
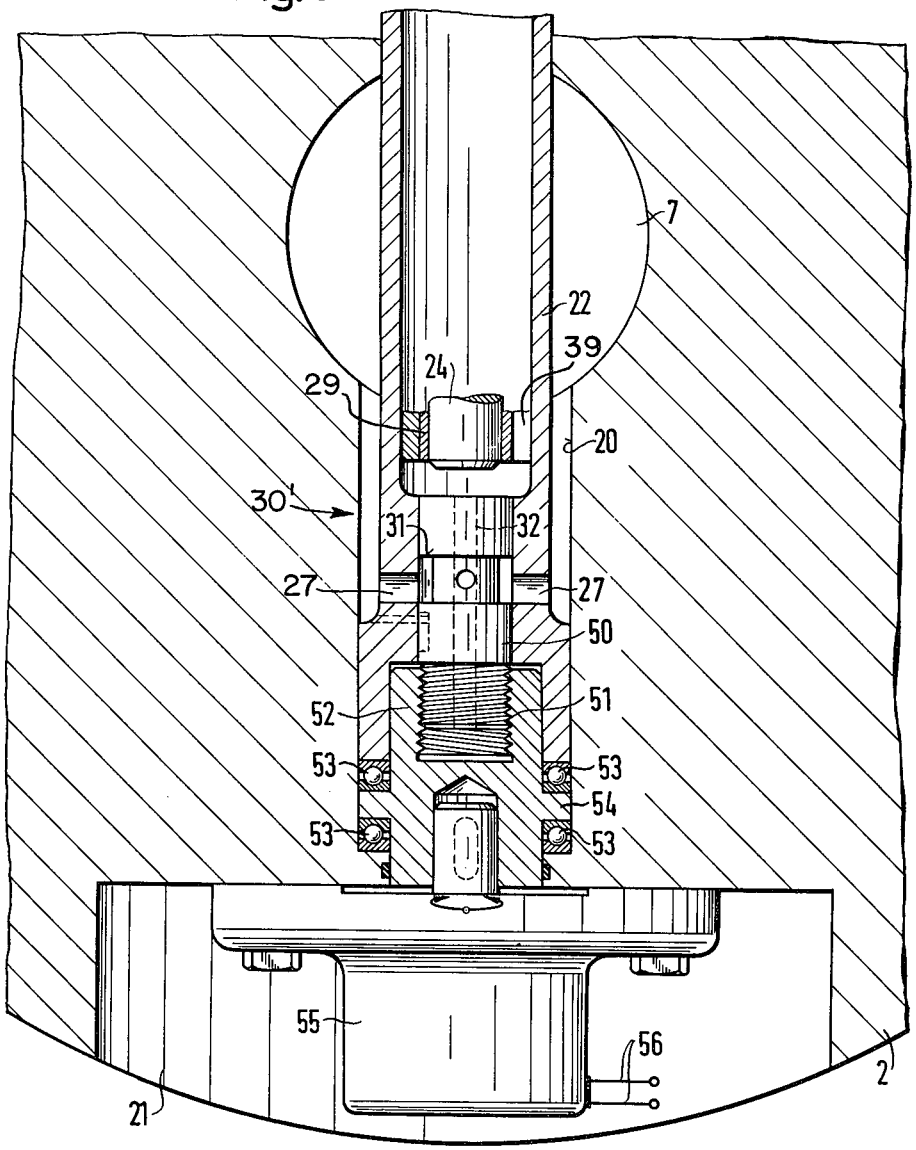
FIG. 3 is a fragmentary view similar to that of FIG. 2 shown however on an enlarged scale and illustrating another controlled deflection roll according to the invention.

FIG. 3 illustrates another embodiment of the invention which employs however an electrical as distinguished from a hydraulic or other fluid control signal for adjustment of the valve by which the force exerted on the roll shell by the roll shell support member is controlled. The embodiment of FIG. 3 employs a valve 30' which may be of the same construction as that of FIG. 2, except that the slide valve member 50, which is held against rotation, terminates at its lower end in a threaded portion 51. The threaded portion 51 engages with the thread of a rotatable member 52 supported at bearings 53 which permit rotation of the member 52 about an axis coaxial with that of the slide valve member 30, but which hold the member 52 against axial motion. Rotation of the member 52 thus effects axial motion of the slide valve member 30. These rotations of the member 52 are produced by a motor 55 controllably energized by conductors 56.

The invention thus provides a roll comprising a beam 2, a hollow roll shell 1 surrounding the beam, with clearance therefrom, and a plurality of fluid-actuated shell supporting elements 3' arranged on the beam.

These shell supporting elements 3' may advantageously include a roll shell support member 3 in the form of a piston, and a cylindrical guide surface 10 for the piston. The roll further comprises a pressure fluid duct 7 and a separate duct, for example as indicated in FIG. 2 at 26, 27, 34, 33, 32, 42, 39 and 23, connecting from each of the shell supporting elements (and in particular from the guide surface 10 thereof) to the pressure fluid duct 7. Further, the roll comprises adjustable flow control means in at least one of those separate ducts. In the embodiment illustrated, these flow control means include the valve 30' with its valve member 30 and the bushing 22 with its ports 27 in which that valve member works. The valve may be regarded as a throttling element in the duct connecting the shell supporting element to the pressure fluid duct.

While the invention has been hereinabove described in terms of a number of presently preferred embodiments, the invention itself is not limited thereto but rather comprehends all modifications of and departures from those embodiments properly falling within the scope of the appended claims.

I claim:

1. A roll comprising a beam, a hollow roll shell surrounding the beam, a plurality of fluid-actuated shell supporting elements arranged on the beam, said beam having arranged thereon a pressure fluid duct and a separate duct connecting from each of said elements to said pressure fluid duct, said roll further comprising adjustable remotely controllable flow control means in at least one of said separate ducts.

2. A roll according to claim 1 wherein said shell supporting elements include a cylindrical cavity formed in said beam and wherein said flow control means are disposed in an extension of said cavity.

3. A roll according to claim 1 wherein said control means include a movable throttling element and remotely controlled motor means for positional shift of said throttling element.

4. A roll according to claim 3 wherein said throttling element comprises a slide valve member having a flow controlling edge.

5. A roll according to claim 4 wherein said slide valve member has one end face exposed to the fluid pressure in its said associated separate duct, said flow control means further including means to apply a controllable fluid pressure to the opposite end face of said slide valve member.

6. A roll according to claim 5 wherein said last-named means include a membrane, one face of which bears against the said opposite end face of the slide valve member and the other face of which is exposed to said controllable fluid pressure.

7. A roll according to claim 4 wherein said flow control means further include electric motor means to move said slide valve member.

* * * * *